B. WEINSTEIN.
VEHICLE DIRECTION INDICATOR.
APPLICATION FILED JUNE 5, 1919.
1,364,334.
Patented Jan. 4, 1921.
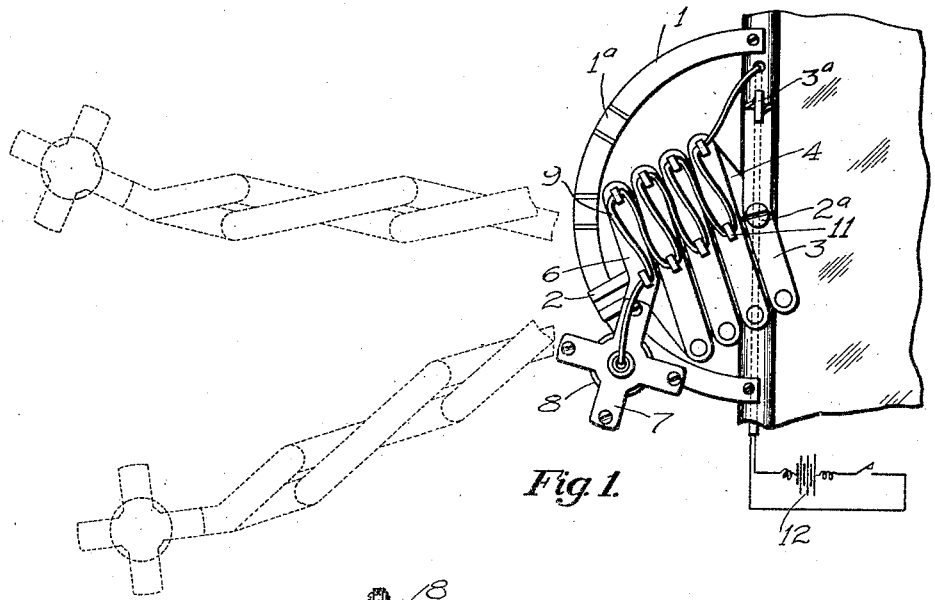
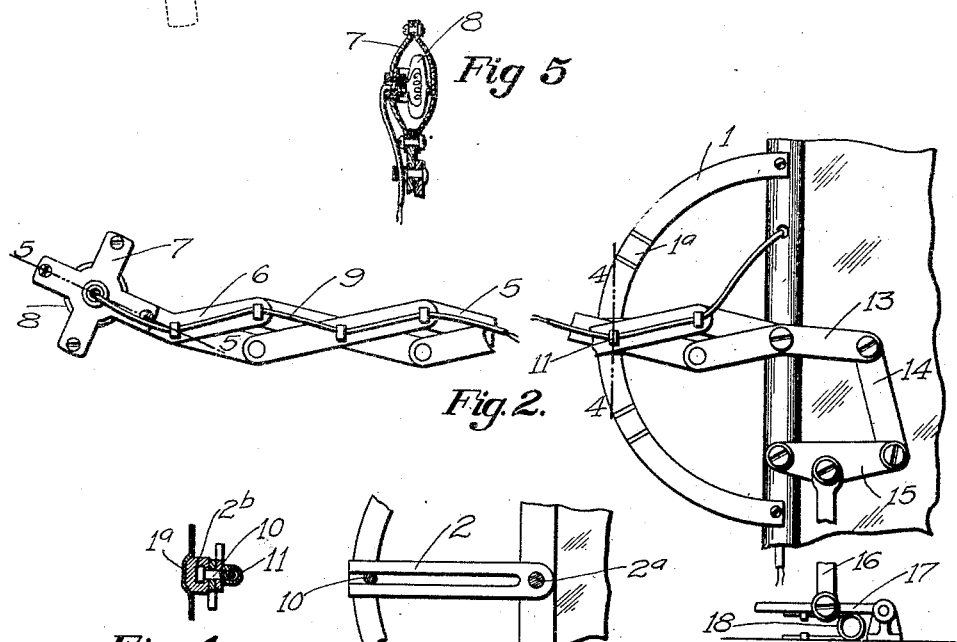
INVENTOR.
BERNARD WEINSTEIN
BY A. B. Bowman
ATTORNEY

UNITED STATES PATENT OFFICE.

BERNARD WEINSTEIN, OF SAN DIEGO, CALIFORNIA.

VEHICLE DIRECTION-INDICATOR.

1,364,334.           Specification of Letters Patent.      Patented Jan. 4, 1921.

Application filed June 5, 1919. Serial No. 301,879.

*To all whom it may concern:*

Be it known that I, BERNARD WEINSTEIN, a citizen of the United States, residing at San Diego, in the county of San Diego and State of California, have invented certain new and useful Vehicle Direction-Indicators, of which the following is a specification.

My invention relates to a device to be attached to a vehicle for indicating the direction the vehicle is about to take when driven about on the streets and the objects of my invention are: first, to provide a device which may be readily extended and raised and lowered to varying angles for indicating the direction a vehicle is about to take; second, to provide such a means which folds up in a very compact form when not extended; third, to provide a device of this class which may be operated either by hand or foot; fourth, to provide a device of this class with means for illuminating the same when used at night or in the dark and fifth, to provide a device of this class which is very simple and economical of construction, durable, easy to operate, easy to install and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of my device in its inoperative or collapsed position and showing by dotted lines varying extended positions; Fig. 2 is a side elevational view of a fragmentary portion of the device shown in a slightly modified form for operation by foot pedal; Fig. 3 is a detailed side view of the support and guide for the extensible portion of said device; Fig. 4 is a sectional view through 4—4 of Fig. 2 and Fig. 5 is a sectional view through 5—5 of Fig. 2.

Similar characters of reference refer to similar parts and portions throughout the several views of the drawings.

The support 1, guide 2, link 3, link 4, link members 5, link 6, supporting cross 7, lamp 8, conductor 9, bolt 10, lug 11 and battery 12 constitute the principal parts and portions of my vehicle direction indicator in its preferred form.

The support 1 is a semi-circular spring bar secured to the wind shield post or any convenient place and is provided with a plurality of notches $1^a$ adapted for the member 2 to rest in when moved to varying positions. This member 2 and the link 3 are pivotally connected to the wind shield or other suitable place by means of a bolt $2^a$. In the preferred form or hand operative device the link member 3 is pivoted intermediate its ends and at its one end is provided with a handle portion $3^a$. Also pivoted on the bolt $2^a$ is a link 4 and the extended ends of the links 3 and 4 are connected to links 5 and a plurality of these links 5 are connected together at their ends forming a chain of links and the two chains are crossed and connected by pivotal connections at the center of each link forming a device in the form of the ordinary lazy tongs. On the extended end there is provided a special link 6 with an angled extension upon which is mounted a lamp supporting member 7 which is preferably in the form of a cross composed of two centrally bulged members secured together at their outer ends and mounted between these two members at the center is a lamp 8 secured to one of the members. Extending along one of the chain members of the lazy tong structure is a conductor 9 which connects with a battery 12 for illuminating the extended end or cross portion 7 when desired. The cross joints of the tong members are each provided with a bolt 10 which is provided with an extended head adapted for the groove $2^b$ in the guide 2 and the outer link portion is provided with a loop 11 which serves as a support for the conductor and to hold the bolt 10 in a certain relative position.

In the modified form of construction shown in Fig. 2 there is provided a link 13 instead of the link member 3 and to the extended end of the link member 13 is pivotally connected another link 14 to the end of which is connected a lever 15 the one end of which is pivoted on the wind shield or other suitable place and connected to this lever 15 is a rod 16 which extends downwardly and to which is pivotally connected a foot pedal 17 pivotally mounted in a suitable place on the floor of the vehicle body and between said lever and the floor is mounted a torsion spring 18 tending to hold said foot pedal 17 upwardly at all times.

Though I have shown and described a particular construction, combination and arrangement of parts and portions and certain modifications thereof I do not wish to be limited to this particular construction, combination and arrangement nor to the modification, but desire to include in the purview of my invention the construction, combination and arrangement substantially as set forth in the appended claims.

It is obvious that with this construction there is provided a device in which an arm may be extended and placed in varying positions determining the direction the vehicle is about to take which is operable as follows: The driver grasps the hand member $3^a$, moves it on the screw $2^a$ which extends the device so that the member 7 is thrust outwardly some distance as shown by dotted lines in Fig. 1 of the drawings after which it may be used in various positions by further movements of this arm which will move the guide 2 together with the lazy tong structure upwardly upon the support 1 to any of the notches $1^a$, it being desirable to use the lower notch to indicate slow down or stop, the intermediate notch a turn to the left and the upper notch a turn to the right. In the modified form shown in Fig. 2 the operation is the same except that the device is operated by the foot by depressing the pedal 17 operating the rod 16, lever 15, link 14 and 13 and spring 18 collapsing the device when released.

Having thus described my invention what I claim as new and desire to secure by Letters Patent, is:

1. A vehicle direction indicator, including a lazy tongs structure pivotally mounted on the vehicle wind shield provided with an extended arm for manually operating said lazy tongs structure, a signaling member mounted on the free end thereof, a guide member mounted on the same pivotal axis with said lazy tongs structure adapted to receive and support bolts forming the cross joints of said lazy tongs structure, an arm support for said guide member provided with notches for engagement of said guide member whereby the extended end of said lazy tongs structure may be shifted to varying angles.

2. A vehicle direction indicator, including a lazy tongs structure pivotally mounted on a vehicle wind shield, a signaling member mounted on the free end thereof, a guide member mounted on the same pivotal axis with said lazy tongs structure adapted to receive and support bolts forming the cross joints of said lazy tongs structure and an arch shaped spring member provided with notches adapted to be engaged by said guide member for holding said lazy tongs structure on varying angles whereby three different angular positions are provided for the extended end of said lazy tongs structure.

In testimony whereof I have hereunto set my hand at San Diego, California, this 29 day of May, 1919.

BERNARD WEINSTEIN.